M. SCRANNAGE.

TUMBLER WASHER.

No. 7,284. Reissued Aug. 29, 1876.

Witnesses;
W. J. Cambridge
J. E. Cambridge

Inventor,
Matthew Scrannage
per Teschemacher & Stearns
Attys.

UNITED STATES PATENT OFFICE.

MATTHEW SCRANNAGE, OF BOSTON, MASSACHUSETTS.

IMPROVEMENT IN TUMBLER-WASHERS.

Specification forming part of Letters Patent No: 82,997, dated October 13, 1868; reissue No. 7,284, dated August 29, 1876; application filed July 15, 1876.

*To all whom it may concern:*

Be it known that I, MATTHEW SCRANNAGE, of Boston, in the county of Suffolk and State of Massachusetts, have invented certain new and useful Improvements in Tumbler-Washers, of which the following is a full, clear, and exact description, reference being had to the accompanying drawings, making part of this specification, in which—

Figure 1:
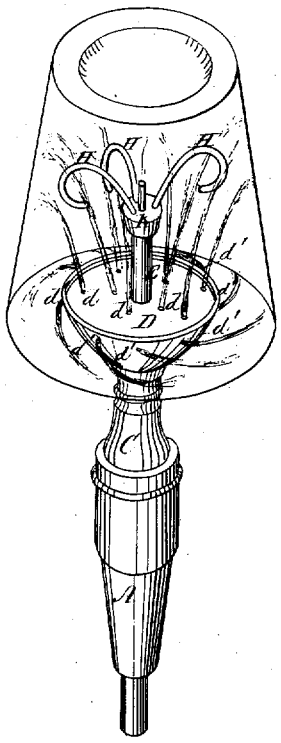
Figure 2:
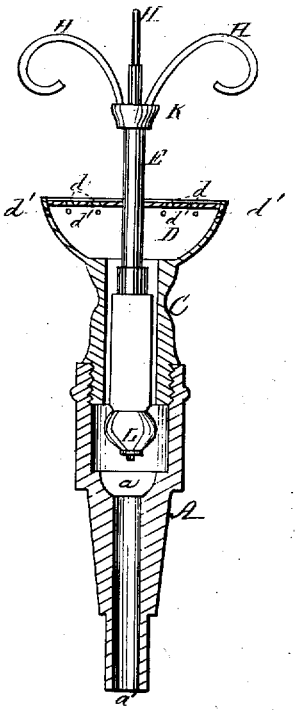

Figure 1 is a perspective view of my improved tumbler-washer, with a tumbler in place thereon. Fig. 2 is a vertical section through the same, the tumbler being removed.

My invention consists in a tumbler-washer in which the tumbler is placed upon a suitable vertical support and revolved in its longitudinal axis by the action of one or more jets of water, by which means the washing is effected in a thorough manner with much less water than where the tumbler is stationary, as in the tumbler-washers heretofore constructed.

To enable others skilled in the art to understand and use my invention, I will proceed to describe the manner in which I have carried it out.

In the said drawings, A represents a tube to be fastened to the supply-pipe. *a'* is a water-passage, terminating in a countersink, *a*, Fig. 2. L is a valve attached to the stem E, and so arranged within the tube C that the action of the water pressing upward will completely close the tube C at its bottom, thus preventing the water from entering a rose, D, attached to the upper end of the tube C, unless the valve is pressed down by a force acting through the stem E. The rose D is provided with a number of perforations, *d d'*, those *d'* being arranged so as to discharge the water tangentially. K is a swivel, which is free to revolve upon the valve-stem E, and carries a number of arms, H H, which serve to support the tumbler when inverted and placed thereon, as seen in Fig. 1.

The operation of my tumbler-washer is as follows: When there is no weight upon the spindle E, the valve L is pressed upward against the lower end of the tube C, so as to prevent the flow of the water; if, however, the spindle E is subjected to downward pressure, the valve L will be depressed, when the water will be admitted to the rose D, and thence discharged through the orifices *d d'*.

If a tumbler is placed upon the arms H, as represented in Fig. 1, its weight will keep the valve L open and allow the water to be discharged against the interior surface of the tumbler for the purpose of cleansing it, and, as the support H K, upon which the tumbler is placed, is free to rotate upon the stem E, the action of the jets of water from the orifices *d'* of the rose D against the interior of the tumbler will cause it to revolve, thus insuring the contact of the water with all portions of its interior surface, whereby it is thoroughly cleansed with a much less number of jets than have heretofore been required.

What I claim as my invention, and desire to secure by Letters Patent, is—

1. A tumbler-washer, provided with a vertical revolving support, adapted to rotate the tumbler on its longitudinal axis, substantially as and for the purpose set forth.

2. The rose D, provided with tangentially-discharging orifices *d'*, in combination with a rotating support for the tumbler, substantially as and for the purpose described.

Witness my hand this 13th day of July, A. D. 1876.

MATTHEW SCRANNAGE.

In presence of—

P. E. TESCHEMACHER,

L. HENDERSON.